(12) United States Patent
Mukherjee

(10) Patent No.: US 10,810,063 B2
(45) Date of Patent: Oct. 20, 2020

(54) FAULT TOLERANT MULTI-PROCESSOR DEVICE

(71) Applicant: Texas Instruments Incorporated, Dallas, TX (US)

(72) Inventor: Somnath Mukherjee, Bangalore (IN)

(73) Assignee: TEXAS INSTRUMENTS INCORPORATION, Dallas, TX (US)

( * ) Notice: Subject to any disclaimer, the term of this patent is extended or adjusted under 35 U.S.C. 154(b) by 0 days.

(21) Appl. No.: 16/358,649

(22) Filed: Mar. 19, 2019

(65) Prior Publication Data

US 2020/0301766 A1  Sep. 24, 2020

(51) Int. Cl.
*G06F 9/54* (2006.01)
*G06F 15/78* (2006.01)

(52) U.S. Cl.
CPC .......... *G06F 9/546* (2013.01); *G06F 15/7807* (2013.01)

(58) Field of Classification Search
CPC .............................. G06F 9/546; G06F 15/7807
See application file for complete search history.

(56) References Cited

U.S. PATENT DOCUMENTS

| | | | |
|---|---|---|---|
| 2007/0101206 A1* | 5/2007 | Brabant | G06F 11/0757 714/55 |
| 2008/0086626 A1* | 4/2008 | Jones | G06F 9/30003 712/225 |
| 2014/0223158 A1* | 8/2014 | Zhou | G06F 9/4405 713/2 |

* cited by examiner

*Primary Examiner* — Charles E Anya
(74) *Attorney, Agent, or Firm* — Ebby Abraham; Charles A. Brill; Frank D. Cimino

(57) ABSTRACT

Described herein is a technology for account for messages or data that are not read by a receiver unit in a device. A sender unit collects data from a data source, which is passed on stored in an inter-processor communication (IPC) module. The receiver unit receives the data from the IPC module, while the sender unit predicts an expected time that that receiver unit will read the data and whether the receiver unit will actually read the data.

16 Claims, 6 Drawing Sheets

FAULT TOLERANT MULTI-PROCESSOR DEVICE

BACKGROUND

In computing devices having multiple processing units or processors, the processing units or processors communicate with one another, and receive and process data and information from one another. In certain implementations, data and information is sent from a first processing unit to a second processing unit that performs computations. In certain instances, the second processing unit is unable to process the data and information from the first processing unit, while the first processing unit assumes that the data and information has been processed and continues to send other data and information to the second processing unit, resulting in failed or erroneous results.

SUMMARY

Described herein is a device, such as a system on a chip, with one or more processing units that collect data from one or more data channels. Collected data is sent from a sender unit to a receiver unit that processes the data. An inter-processor communication (IPC) module intermediately stores data sent from the sender unit to the receiver unit. As data is sent from the sender unit, the sender unit dynamically predicts a time for the receiver unit to read the data and determines whether the receiver unit will read the data. The IPC module times out after expiration of the predicted time to read or if it is determined that the receiver unit will not read the data.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
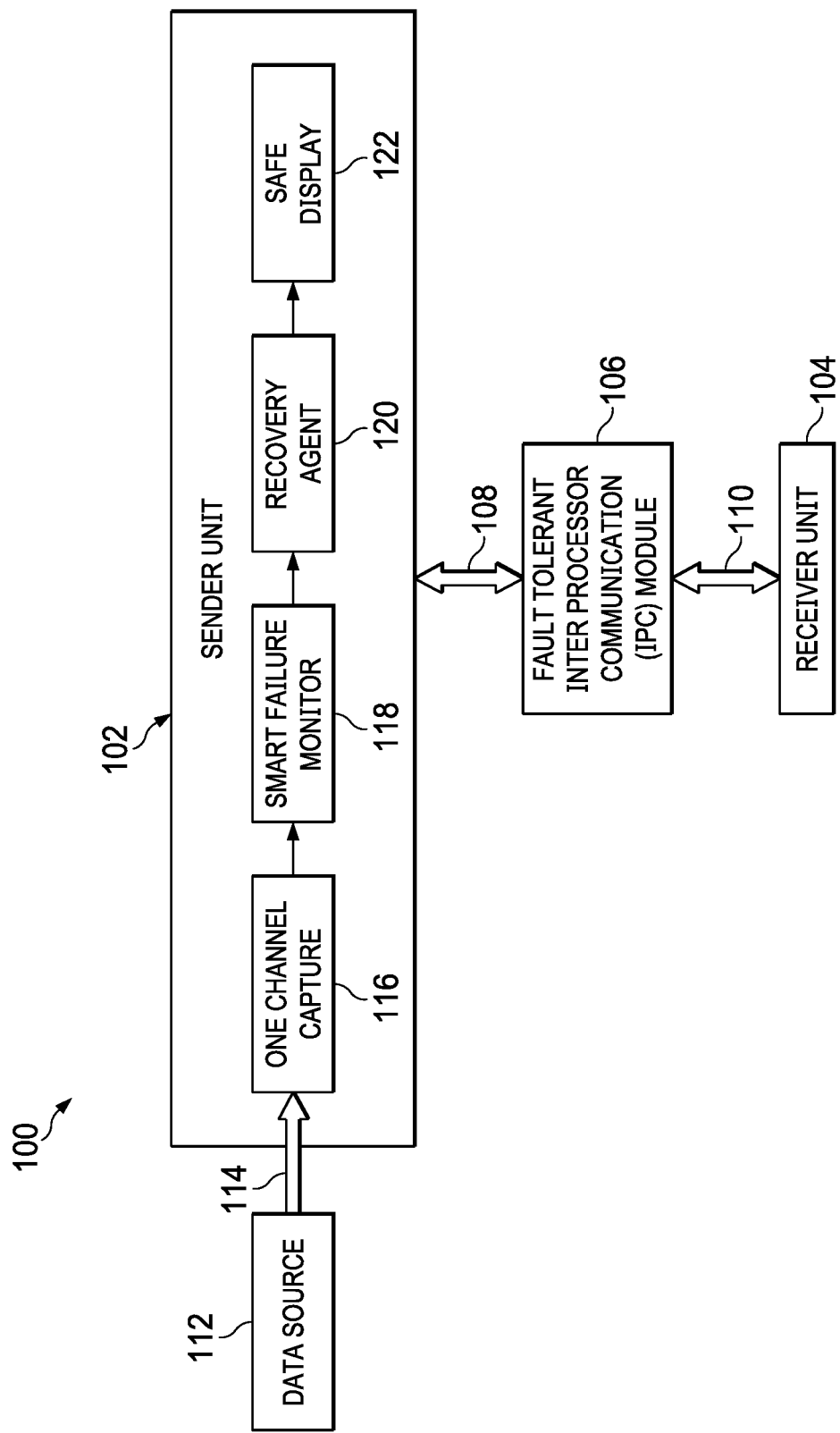
FIG. 1 illustrates a diagram of a sender unit, inter-processor communication module, and receiver unit.

FIG. 1 shows a diagram of a system 100. In certain embodiments, the system 100 is part of device. In certain implementations, the system 100 is a system on a chip or SOC. System 100 includes a sender unit 102 and a receiver unit 104. Sender unit 102 and receiver unit 104 can be considered as processor units or processing units. In certain implementations, the system 100 is a distributed system with multiple sending units and receiving units (i.e., processor units or processing units).

An intermediate fault tolerant inter-processor communication (IPC) module or IPC module 106 is located between the sender unit 102 and receiver unit 104. IPC module 106 can be considered as a data register that performs an intermediate data store of data from sender unit 102 and passes the data along to receiver unit 104. In general, a dedicated IPC module provides communications between a sender unit and receiver unit pair. As shown in FIG. 1, IPC module 106 is dedicated to sender unit 102 and receiver unit 104. Data is passed along a channel or bus 108 from the sender unit 102 to the IPC module 106. Data is passed along a channel or bus 110 from the IPC module 106 to the receiver unit 104. In certain embodiments, busses 108 and 110 are two-way busses that provide communication between the respective units and IPC module 106.

As shown in FIG. 1, system 100 includes a single sender unit 102, a single receiver unit 104, and a single IPC module 106; however, it is to be understood that there can be multiple sender unit and receiver unit pairs, with dedicated IPC modules that provide communication between such pairs. In certain embodiments, such multiple sender unit and receiver unit pairs are part of a heterogeneous multi-core system, such as a system or a chip or SOC.

Sender unit 102 receives information or data from a data source 112 through a channel 114. In certain implementations, channel 114 is a one-way channel. In certain implementations, system 100 supports an automotive environment (not shown). For example, in an automotive environment, the data source 112 includes rear view camera source, surround view source, and other data sources (not shown). In certain embodiments, sender unit 102 receives or collects data from more than one data source through channels connecting each data source. In such implementations, a dedicated IPC module (e.g. IPC module 106) provides an intermediate store for each data source/channel, and passes data to a receiver unit (e.g., receiver unit 104). In a multi-processor environment, such as system 100, example data transfer rates between units (e.g., sender unit 102 and receiver unit 104) can occur at around 16 milliseconds for a 60 frame per second (fps) capture and display.

The sender unit 102 includes a one channel capture component 116 that receives the source data from data source 112 through the data channel 114. For certain implementations with different data sources with different channels, dedicated one channel components can be provided.

In system 100, receiver unit 104 provides for processing and display of the source data. In certain embodiments, receiver unit 104 runs other applications in addition to the processing and displaying of source data received from the sender unit 102 through the IPC module 106.

The sender unit 102 can dynamically predict an expected time for the receiver unit 104 to read the source data and determine whether the receiver unit 104 will read the data. In support of determining the expected time that the receiver unit 104 will read the source and data, sender unit 102 can implement a smart failure monitor component 118 and recovery agent component 120.

If a determination is made that the receiver unit 104 is not able to read the source data in a predicted expected time, the sender unit 102 has the option to resend the source data or to process and display the data at the sender unit 104. If a determination is made that the receiver unit 104 is not able to read the source data, the sender unit 102 can process and display the source data. The sender unit 102 can include a safe display component 122 to provide a display of the source data. Therefore, system 100 is able to account for instances when faults occur when the receiver unit 104 is not able to process the source data, such as when an operating system fails or some other instance that prevents the processing of the source data. In other words, system 100 is fault tolerant. In certain implementations, the sender unit 102 is able to make a determination if the receiver unit 104 has not processed the source data, and corrective action is taken.

Figure 2:
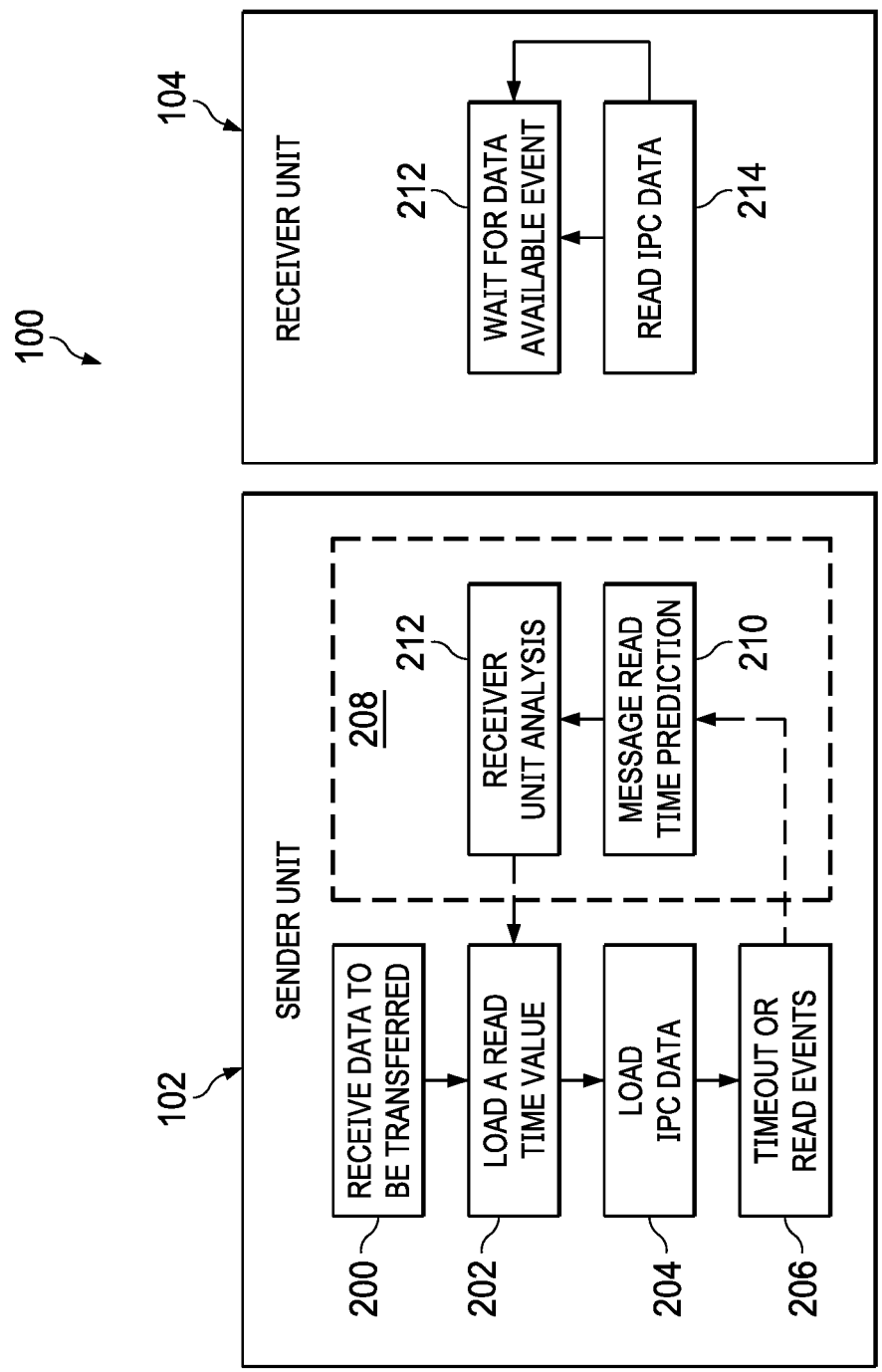
FIG. 2 illustrates a diagram of inter-processor communication (IPC) software algorithms resident on a sender unit and receiver unit.

FIG. 2 shows inter-processor communication (IPC) software algorithms resident on sender unit 102 and receiver unit 104. The algorithms allow for dynamic prediction of data read time by receiver unit 104, and dynamic prediction in analyzing the state of receiver unit 104 based on timing data and associated events.

At block 200, the sender unit 102 receives the source data which is to be transferred to the receiver unit 104. At block 202, sender unit 102 loads a read-time value that can be referred to as a variable "expected_read_time". The read-time value is a time value in which the receiver unit 104 is expected to read the source data. In certain implementations, the algorithms use previous stored samples of an array of "M" number of samples. Such previously stored samples can be referred by a variable "measured_read_time". In particular, the previous stored samples can be used as an initial read-time value. In certain implementations, an average value of the samples in array of "M" is calculated to provide a value for "measured_read_time." The "expected_read_time" value can be set to a "measured_read_time" value. Example message or data read time values include 1000 nanosecond with 100 nanosecond increments.

At block 204, the sender unit 102 loads the IPC or source data into a register in the IPC module 106. At block 206, a wait is performed based on either if a timeout event occurs or if a data read event is performed by receiver unit 104. For either a timeout event or a data read event, the sender unit 102 goes back to block 202 and loads an "expected_read_time" value for the next transaction. At block 204 source or IPC data is loaded. In parallel, as represented by box 208, at block 210, a prediction can be made as to read time of the message or data, which can be based on past data that was read by the receiver unit 104. At block 212, the remote unit 104 waits for a data available event and an analysis can be performed indicating the processing state of the receiver unit 104. At block 214, the receiver unit reads the IPC or source data.

Whenever a particular event occurs, whether a time out or read, the sender unit predicts the next message read time, which is the time that receiver unit 104 is expected to read the next message or data. This prediction is based on the type of event, such as a time out event or read event, and the received history of messages or data. This allows the sender unit 102 to analyze the state of the receiver unit 104.

As discussed above, an automotive environment can be implemented. An example source is video from a rear view camera or surrounding view. For example, in such a context, messages or data from the rear view camera can arrive about every 16 milliseconds. In other words, for every 16 milliseconds, messages or data are placed in registers of the IPC module 106. In certain implementations, such messages or data refer to video data buffers in a main memory of device 100. The receiver unit 104 pulls the data from the registers as long as source data is arriving from the source (e.g., rear view camera).

Figure 3:
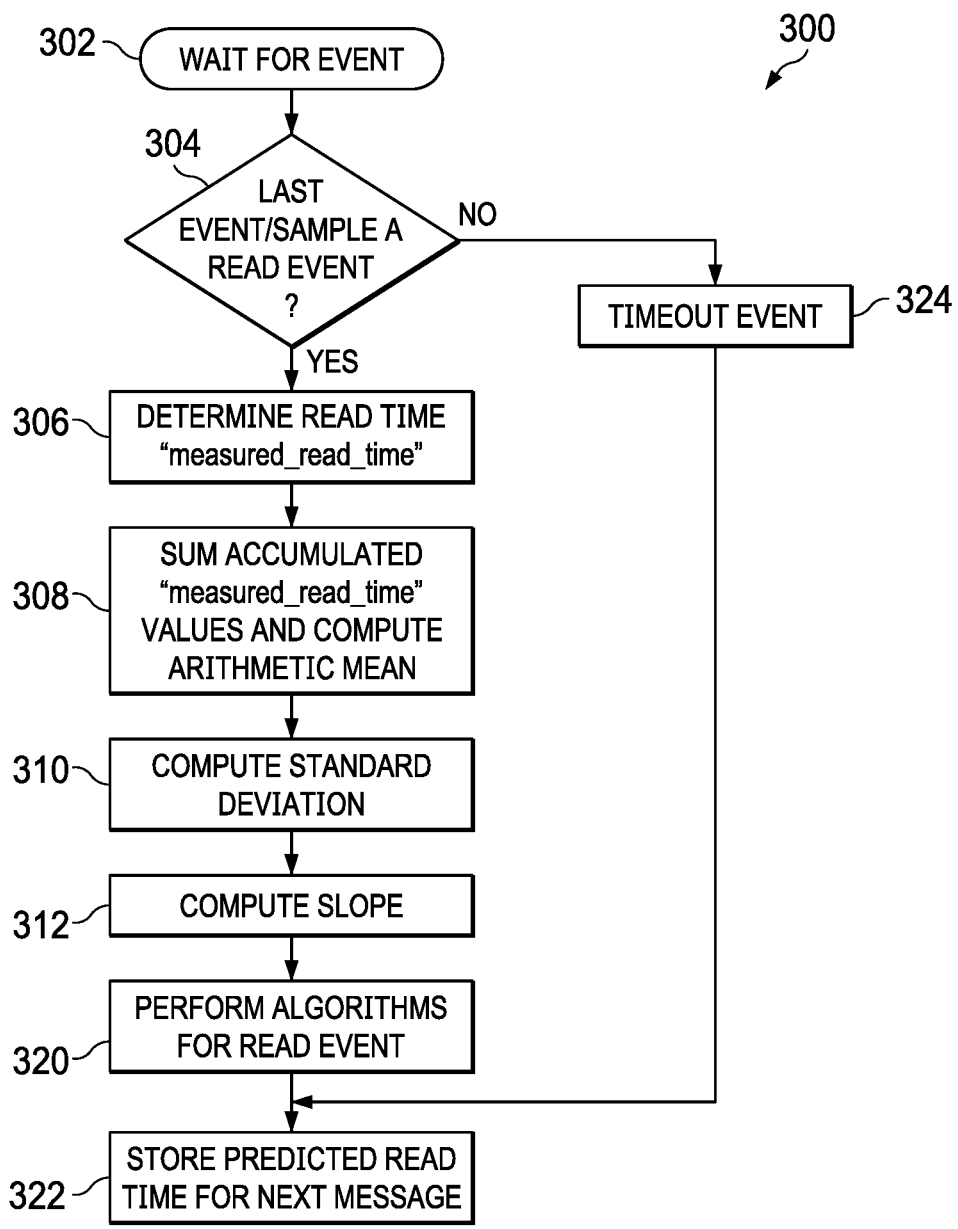
FIG. 3 illustrates a process flow to predict message read time at a sender unit.
Figure 3:
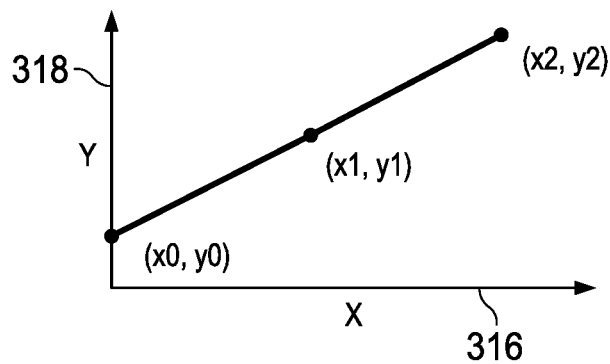

FIG. 3 shows process flow 300 to predict message read time. Data or message read time is designated as the variable "measured_read_time" which is a measured value based on a timing unit of IPC module 106. As discussed, "measured_read_time" can be based on values of an array of "M" number of previously measured samples. The value of measured_read_time is a time value, such as milliseconds (msec).

At block 302, sender unit 102 waits for an event from the IPC module 106. The event can either be a read event or a time out event. At block 304, determining if a read event occurs is performed.

If a read event occurs, following the YES branch of block 304, at block 306 the IPC module 106 provides a "measured_read_time" value which is a time taken by the receiver unit 104 to read the message. A value of "measured_read_time" can be obtained every time a message or data is read by the receiver unit 104. In certain implementations, consecutive values of "measured_read_time" are accumulated.

At block 308, accumulated values of recent collected samples of "measured_read_time" are summed and an arithmetic mean designated as variable "g_dyn_mean" is calculated. The arithmetic mean is considered dynamically calculated, since the calculation is performed as values of "measured_read_time" are accumulated.

At block 310, a dynamic standard deviation designated as variable "g_dyn_stdev" is performed on recent accumulated values of collected samples of "measured_read_time". Computing the arithmetic mean ("g_dyn_mean") and standard deviation ("g_dyn_stdev") of "measured_read_time" can be performed dynamically based on currently collected samples. For example, 50 immediate samples can be used for the arithmetic mean ("g_dyn_mean") and standard deviation ("g_dyn_stdev") performed at blocks 308 and 310.

At block 312, slope is computed. Slope provides a trend or tendency expectation as to a message read time of the receiver unit 104. Referring to the Cartesian coordinate graph 314, samples of "X" 316 are plotted against time values "Y" 318. In this example, three data points (x0, y0), (x1, x1) and (x2, y2) are plotted. Each data point includes a read-time sample number "x" and a corresponding read time value "y". Therefore, x0=0, with a measured read time value of y0; x1=1, with a measured read time value of y1, and x2=2, with a predicted read time value of y2. In the line equation, y=m*x+c, m is the slope of the line. For the line of graph 314, the equation is y2=m*x2+y0. Therefore, the slope is defined as m=(y1−y0)/(x1−x0). In order to get an immediate trend of message read time, the most recent or last two sample values are used.

At block 320, algorithms are performed for read events. In particular, a thresholding of linearly predicted read time values ("y2") is performed. An upper limit threshold read time value or "up_limit" is determined, where an initial calculation is performed by the following:

$$up\_limit = g\_dyn\_mean + 3.0 * g\_dyn\_stdev$$

A lower limit threshold read time value or "low_limit" is defined by the following:

$$low\_limt = g\_dyn\_mean + 1.0 * g\_dyn\_stdev$$

The upper limit ("up_limit") and lower limit ("low_limit") of predicted read time values are determined based on the use case and application scenario. For example, the use case and application scenarios can be directed to an automotive environment with data sources that include a rear view camera source, surround view source, and other data sources.

An "expected_read_time" value is then determined. The following conditions for "expected_read_time" can be followed:

If y2>up_limit, then g_exp_read_time=up_limit
Else if y2<low_limit
Else: expected_read_time=y2

Subsequently, the following conditions are followed:
If y2>up_limit, then g_exp_read_time=up_limit
Else if y2<g_dyn_mean+1.0*g_dyn_stdev),
then expected_read_time=low_limit
Else: expected_read_time=y2

At block 322, a value for a predicted read time designated by the variable "expected_read_time" for the next message is stored. In certain implementations, the value of "expected_read_time" is stored in a predicted read time register of the IPC module 106.

If a read event did not occur, which can imply that a timeout event occurred, following the "NO" branch of block 304, block 324 is performed. This condition can be indicative of a problem occurring at the receiver unit 104. The event can be a timeout or a determination that the receiver unit 104 is unable to read the data or message. Therefore, "expected_read_time" is computed differently than if a read event occurred.

In certain implementations, when a timeout occurs, the predicted read time "expected_read_time" can be based on a factor of certainty or F(c). For example, F(c) can be 1.0 when the previous event was a read event. If the previous event was a timeout, F(c) can set to a varying factor of certainty designated as a variable "g_fc" when the previous event was a timeout. Therefore, a factor of certainty or F(c) is certain with a value of "1" if the previous event was a read event, or dynamic "g_fc" is the previous event was a time out. The predicted read time "expected_read_time" is calculated as follows:

$$expected\_read\_time = g\_dyn\_mean * [1.0/g\_fc] * g\_dyn\_stdev$$

Figure 4:
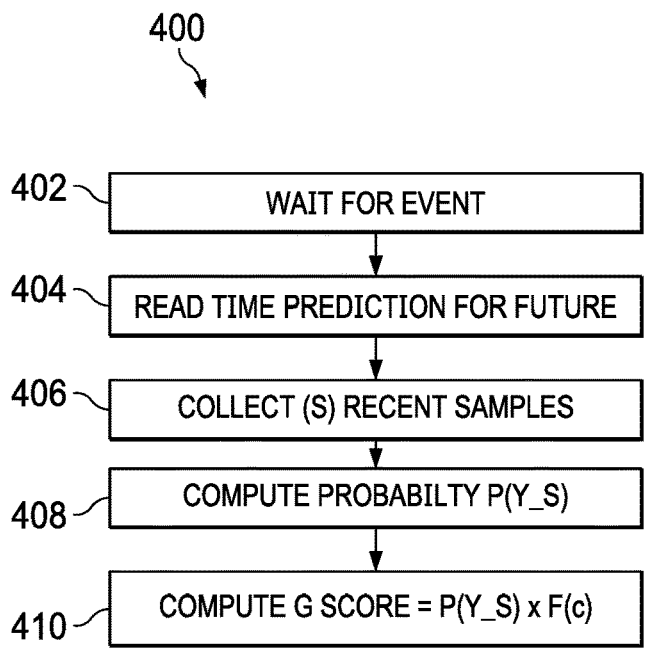
FIG. 4 illustrates a process flow to predict the state of a receiver unit.

FIG. 4 shows a process flow 400 to predict the state of a receiver unit. In certain implementations, the process flow 400 can be performed at the sender unit 102. As discussed above, F(c) is a factor of certainty that a message or data will be read by the receiver unit 104. F(c) can be dynamically adapted up or down based on message or data events.

Factor of certainty or F(c), also indicates some level of uncertainty when the last message or data was not read by the receiver unit 104. If the last message or data was not read by the receiver unit, then F(c) is assessed since there can be an indication of a problem. F(c) is "1.0", indicating a very high chance that the next message will be read by the receiver unit 104, if a previous message was read by the receiver unit 104; however, factor of certainty can dynamic, F(c)=g_fc, when the previous message was not read by the receiver unit 104. The maximum value of "g_fc" can be set to 0.5, indicating a gradually lower chance of the receiver unit 104 reading the next message. The variable "g_fc" is dynamically adapted down when the previous two messages were not read by the receiver unit 104. The variable "g_fc" is adapted upward when the last message was read by the receiver unit 104. Upward adaption of variable "g_fc" stops at 0.5, indicating best chance of receiver unit reading the next message when the immediate past event has been a timeout. The variable "g_fc" can be dynamically adjusted down by a constant g_fc_adjustment_factor=0.8, when the previous two messages were not read by the receiver unit 104. The "g_fc_adjustment_factor" indicates the rate at which the factor of certainty F(c) goes down, when the previous message was not read by the receiver unit 104 and when consecutive messages are not read by the receiver unit 104.

At block 402, an event is waited on by the sender unit 102. The event can be a read event or timeout event.

At block 404, as discussed above as to FIG. 3, prediction as to message read time at a sender unit is performed.

At block 406, a prediction is performed using an "S" number of event data (read or timeout) to predict the state of receiver unit 104. As discussed above, the read time prediction algorithm operates on an array of "M" number of samples. "S" is a value less than or equal to "M". There are a greater number of M samples than S in order to accurately predict the next message read time ("expected_read_time"). For prediction of a state of receiver unit 104, relatively small number of S samples can be needed. However, S is less than or equal to M.

At block 408, P(Y_S) is calculated, where P(Y_S) is a percentage of messages or data read by the receiver unit 104 from the "S" samples.

At block 410, a value designated by the variable "g_score" is calculated, where "g_score" is a score value that indicates the health of the receiver unit 104. The value of "g_score" is calculated from P(Y_S)×F(c). F(c)=1.0, if the previous message was read by the receiver unit 104. F(c)=g_fc if the previous message was not read by the receiver unit 104. The maximum value of "g_fc" is 0.5. Variable "g_fc" is adapted up or down based on previous events.

The variable "g_fc" is dynamically adapted when the last two messages are not read by receiver unit 104, where "evt_0" is defined as a last message event and "evt_1" is defined as a previous to the last message event. In other words, "evt_0" and "evt_1" are the last two messages. A current factor of certainty or "g_fc_current" and a subsequent factor of certainty or "g_fc_next" can be calculated based on the following conditions:

g_fc_current=g_fc;
If evt_0==0 (not read) and evt_1==0 (not read), then
g_fc_next=g_fc_current*g_fc_adjustment_factor
where:
g_fc_current is present value of F(c).
g_fc_next is the value of F(c) which will be used next The evt_0=is a last message event. Its value is 0 if the message was not read by receiver unit 104 within the expected time. Similarly, evt_1 is the previous to the last message event. Factor of certainty goes down further when the previous two messages have not been read by the receiver unit 104 within the programmed time.

When the last message is read by receiver unit 104, the following condition is followed:
g_fc_current=g_fc;
g_fc_next=g_fc_current/g_fc_adjustment_factor When the receiver unit 104 starts reading the message, confidence which is represented by the variable "g_fc" goes up and this is adapted upward; however, upward adaption may be limited at g_fc=0.5.

Figure 5:
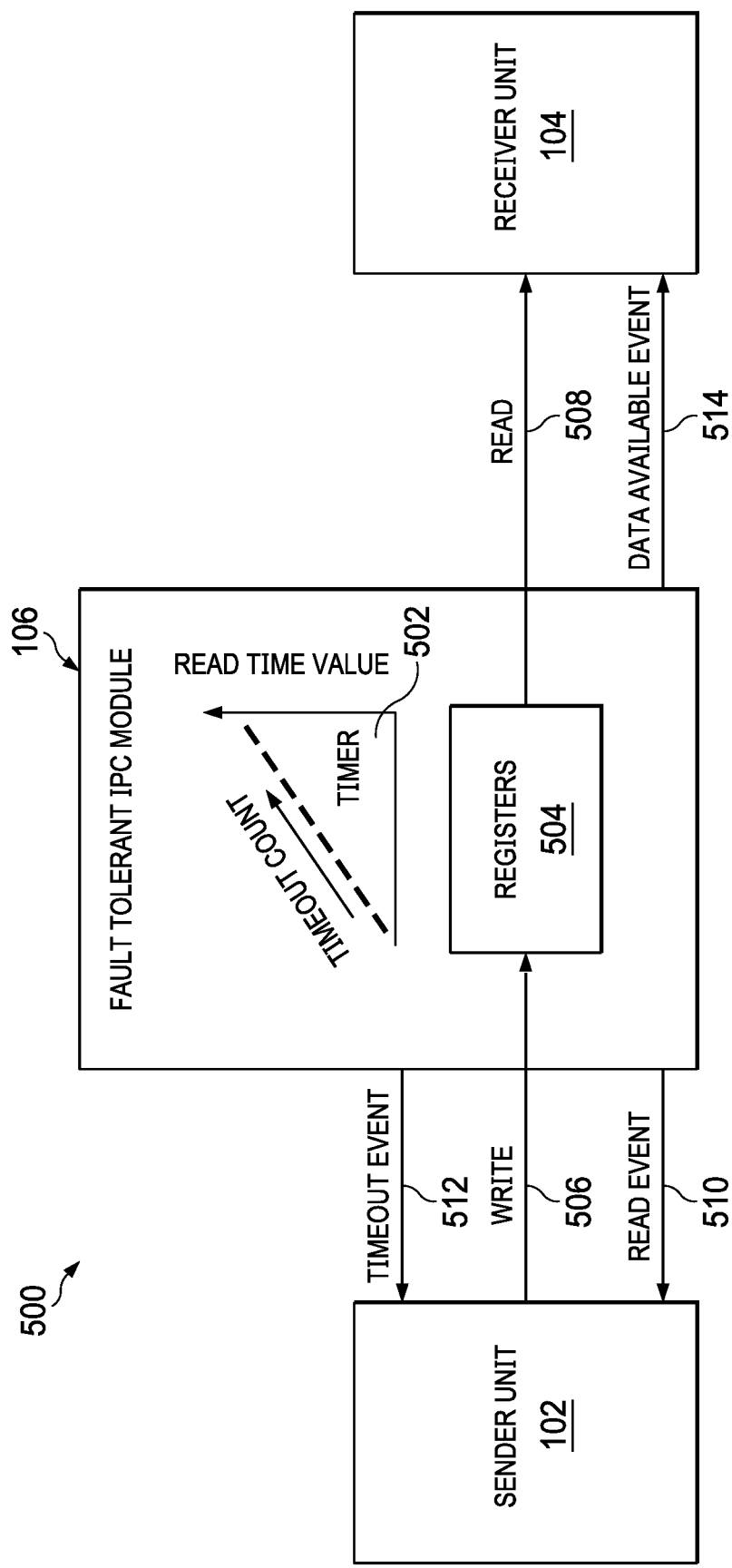
FIG. 5 illustrates a state diagram of an inter-processor communication module.

FIG. 5 shows a state diagram of IPC module 106. The IPC module 106 includes a timer 502 and registers 504. The registers 504 can include a register that stores a value "ipc_data" which is data loaded by the sender unit 102. Registers 504 can include a register that stores a value "expected_read_time" which is loaded prior to the loading of "ipc_data" in its register. Registers 504 further include a register that holds the value "timer_count", the value of which starts counting after "ipc_data" is loaded in its register, and stops counting when the register holding "ipc_data" is read by the receiver unit 104.

The sender unit 102 writes data to the registers 504, as represented by WRITE arrow 506. When the WRITE event occurs (WRITE arrow 506), timer 502 starts counting. Based on a time out value or the predicted read time value as discussed above, if the data is read by receiver unit 104 (i.e., ipc_data register is read by receiver unit 104), as represented by READ arrow 508, a read event or read_evt as represented by arrow 510 is sent to the sender unit 102. If the receiver unit 104 does not read the data within the time out value (i.e., when timer_count reaches read_time_val), a timeout occurs and a timeout event or "timeout_evt" as represented by arrow 512 is sent back to the sender unit 102. The receiver unit 104 receives a data available event or "data_avail_event" (i.e., when sender unit 102 loads data in the "ipc_data" register) as represented by arrow 514, when the sender unit 102 loads data into the registers 504.

Figure 6:
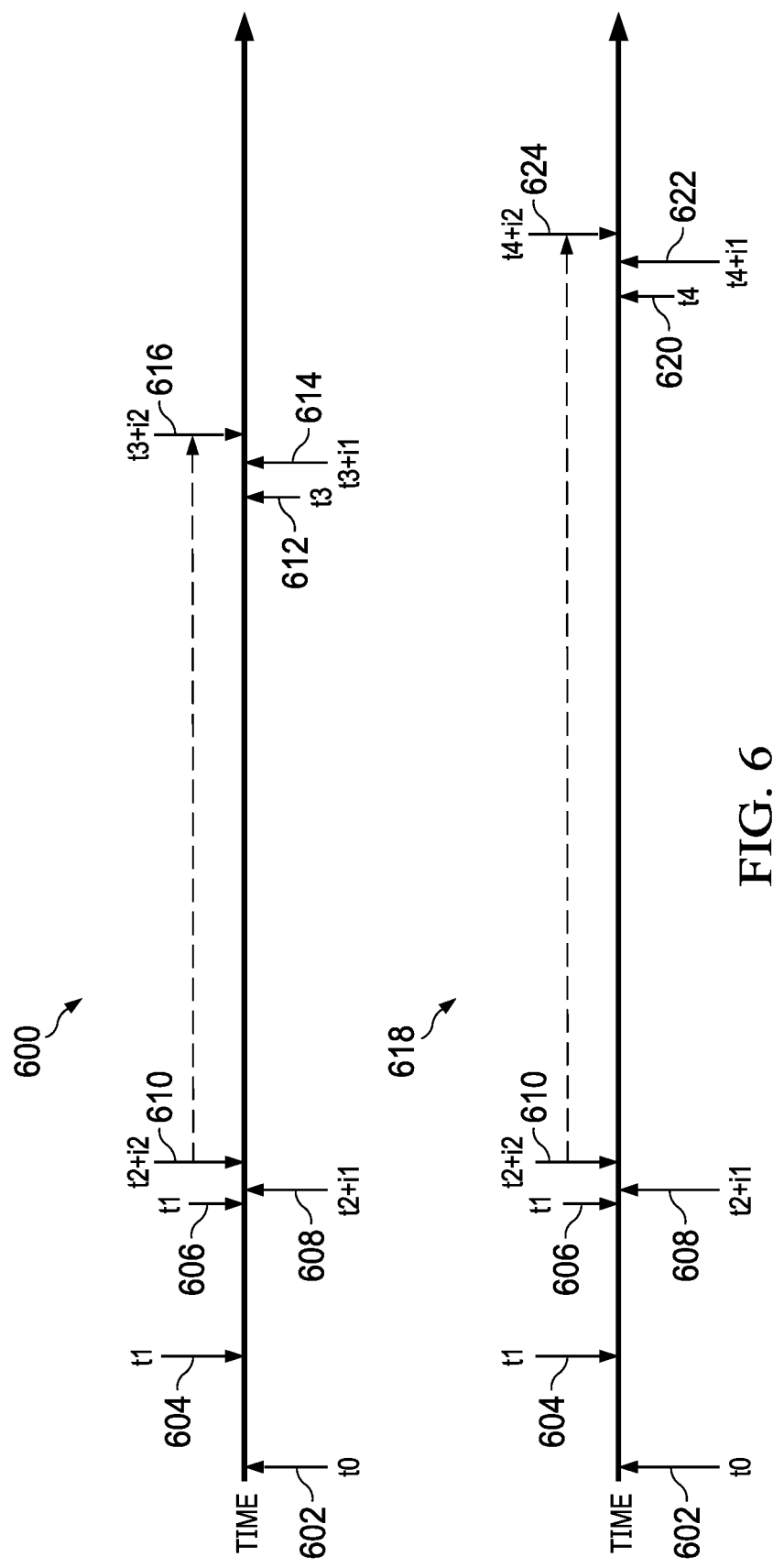
FIG. 6 illustrates a timing diagram or hardware state transition diagram of inter processor communication.

FIG. 6 shows a timing diagram or hardware state transition diagram. The events described by the diagrams are performed by resident software and hardware on the system 100. Timing diagram 600 describes events when a read event occurs at receiver unit 104. The events described by timing diagram 600 relate to when the receiver unit 104 is able to read data.

Time "t0" 602 is a relative initial time. At time "t1" 604, system software through sender unit 102 loads read time value or "read_time_val", as described above, into registers 504. At time "t2" 606, when system software through sender unit 102 loads IPC data or "ipc_data", as described above, into registers 504. At time "t2+i1" 608, the hardware clears timer value register in registers 504. The value of "i1" is a hardware or processor clock cycle or a number of clock cycles to clear the time value register. Time "t2+i2" 610 is an instance after "t2+i1" 608 when the system 100 hardware generates a data available event or "data_avail_event" (i.e., when sender unit 102 loads data in the "ipc_data" register), as described above. The value "i2" is another clock cycle or a number of clock cycles after "i1". The timer 502 begins counting at time "t2+i2" 610. At time "t3" 612, software at receiver unit 104 is expected to read the data (i.e., "ipc_data") from the "ipc_data" register in registers 504. At time "t3+i1" 614, system 100 hardware clears the "data_avail_event", as described above. At time "t3+i2" 616, the timer 502 stops counting, and system hardware generates a read event as described above to the sender unit 102.

Timing diagram 618 describes events when receiver unit 104 fails to read the "ipc_data" from registers 504. In other words, a read event fails or times out at receiver unit 104. At time "t4" 620 a time out occurs. At time "t4+i1" 622, a timeout event notification as described above is sent to sender unit 102. At time "t4+i2" 624, the timer 502 stops counting.

Figure 7:
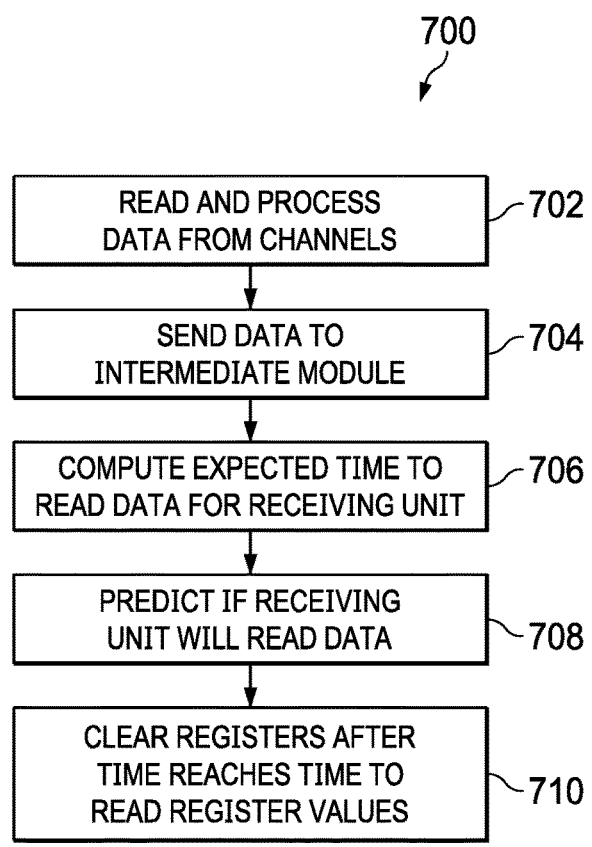
FIG. 7 illustrates a process flow of communicating data between processing units.

FIG. 7 shows an example process chart 700 illustrating an example method of communicating data between processing units. As discussed above, communication between processing units, such as sender unit 102 and receiver unit 104 is monitored by an inter-processor communication or IPC module 106 to determine if data or messages are read by the receiver unit 104, and to take corrective action.

The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 702, one or more channels read data or messages are read from one or more channels. For example, the sender unit 102 reads through the one or more channels the data or messages from data source 112.

At block 704, data or message are sent to an intermediate module. For example, the sender unit 102 sends the data or messages to the inter-processor communication IPC module 106.

At block 706, an expected time for the receiver unit 104 to read the data is computed. For example, the expected time can be computed by at the sender unit 102.

At block 708, a prediction is made if the receiver unit 104 will read the data. The prediction is determined at the sender unit 102.

At block 712, the registers of the IPC module 106 are cleared after a predicted or determined time expires. Clearing the registers allows for new data or messages to be sorted by the IPC module 106.

What is claimed is:

1. A system on a chip (SOC) for dynamically, predicting an expected time for reading data, the SOC comprising:
   a first processor;
   a second processor; and
   an inter-processor communication (IPC) module that receives and stores data from the first processor that collects data from a data source, and sends stored data to the second processor, wherein the first processor is operable to dynamically predict an expected time for the second processor to read the stored data and determine whether the second processor will rear the stored data, and wherein the first processor dynamically predicts the expected time through computation of at least one of an arithmetic mean or a standard deviation of data read time based on an M number of past measured samples, wherein M is an integer greater than 1.

2. The device of claim 1 wherein the IPC module times out after expiration of the expected time for the second processor to read the data or if a determination is made by the first processor unit that the second processor unit will not read the data.

3. The device of claim 1, wherein the data source is from one or more channels in an automobile data environment.

4. The device of claim 1, wherein the expected time for the second processor to read the data is dynamically predicted based on expected IPC event occurrences from the one or more channels.

5. The device of claim 1 further comprising determining if the second processor is active based on a history of measured time to read data and failed read events collected by the first processor.

6. The device of claim 1, wherein the first processor limits the predicted time-to-read the next data, if a time for the next data goes above an upper limit.

7. The device of claim 1, wherein the first processor limits the predicted time-to-read the immediate next data, if a time for the next data goes below a lower limit.

8. The device of claim 1, wherein the first processor unit dynamically predicts an expected time for the second processor to read the data dynamically based on a factor of certainty, when a previous or last data was not read by the second processor.

9. The device of claim 8, wherein the first processor dynamically adapts the factor of certainty down, if last two messages are not read by second processor unit.

10. The device of claim 8, wherein the first processor dynamically adapts the factor of certainty up, if last message was read by second processor.

11. The device of claim 8, wherein the first processor limits maximum value of the factor of certainty to 0.5.

12. A method of dynamically predicting an expected time for reading data, the method comprising:
   storing data from a first processor that collects data from a data source;
   sending stored data to a second processor;
   computing at least one of an arithmetic mean or a standard deviation of data read time based on an M number of past measured samples, wherein M is an integer greater than 1, to dynamically predicting an expected time for the second processor to read the stored data and
   determining whether the second processor will read the stored data based on the computation.

13. The method of claim 12, wherein the data source is from one or more channels in an automobile data environment.

14. The method of claim 12, further comprising limiting the predicted time-to-read the next data if a time for the next data goes above an upper limit.

15. The method of claim 12, further comprising limiting the predicted time-to-read the next data if a time for the next data goes below a lower limit.

16. The method of claim 12, further comprising predicting an expected time for the second processor to read the data based on a factor of certainty, when a previous or last data was not read by the second processor.

\* \* \* \* \*